US005687642A

United States Patent [19]

Chao

[11] Patent Number: 5,687,642

[45] Date of Patent: Nov. 18, 1997

[54] CONCAVE INDUCTION COOKING SURFACE FOR WOK COOKING

[76] Inventor: Nathan Chao, 38 Merrison St., Teaneck, N.J. 07666

[21] Appl. No.: 541,606

[22] Filed: Oct. 10, 1995

[51] Int. Cl.[6] .............................. A47J 37/10; H05B 6/12

[52] U.S. Cl. ....................... 99/451; 99/DIG. 14; 99/422; 219/624

[58] Field of Search .............................. 99/451, DIG. 14, 99/DIG. 13, 422; 219/620, 621, 624, 625, 634

[56] References Cited

U.S. PATENT DOCUMENTS

| | | | |
|---|---|---|---|
| 3,085,142 | 4/1963 | Baermann | 219/622 |
| 3,949,183 | 4/1976 | Usami et al. | 219/622 |
| 4,092,511 | 5/1978 | Austin | 219/624 |
| 4,889,103 | 12/1989 | Fraioli | 126/42 R |
| 4,900,884 | 2/1990 | Aoki | 219/625 |
| 4,910,372 | 3/1990 | Vukich | 219/622 |
| 5,032,699 | 7/1991 | Hu | 219/621 |
| 5,053,593 | 10/1991 | Iguchi | 219/624 |
| 5,070,222 | 12/1991 | Yahav et al. | 219/621 |
| 5,129,314 | 7/1992 | Hu | 99/422 |
| 5,512,733 | 4/1996 | Takikawa et al. | 219/620 |

*Primary Examiner*—Reginald L. Alexander

[57] ABSTRACT

A concave induction cooking surface (12) for wok cooking that consists of a concave glass surface (16) with a concave induction coil (14) located underneath, which are all mounted onto a cooking unit (10) that contains a control knob (18) and a visual display (20).

4 Claims, 3 Drawing Sheets

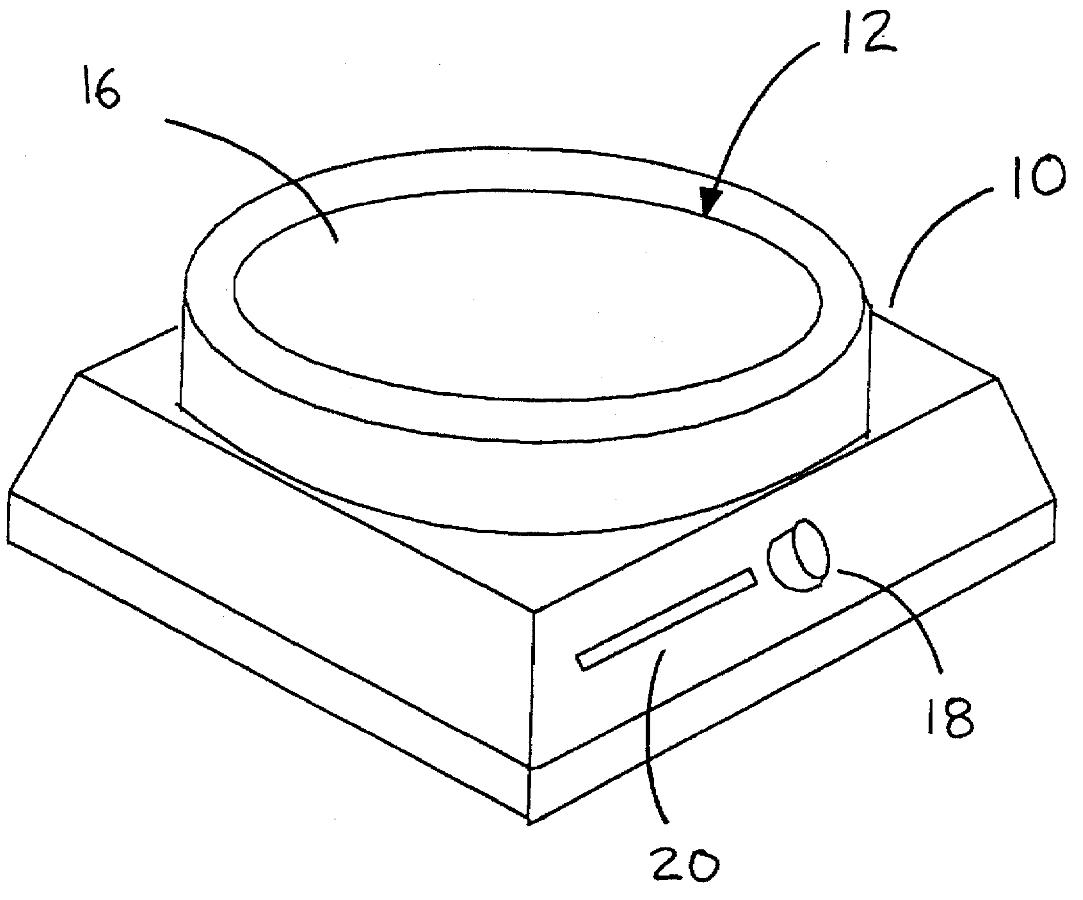
FIG. 1 PERSPECTIVE VIEW

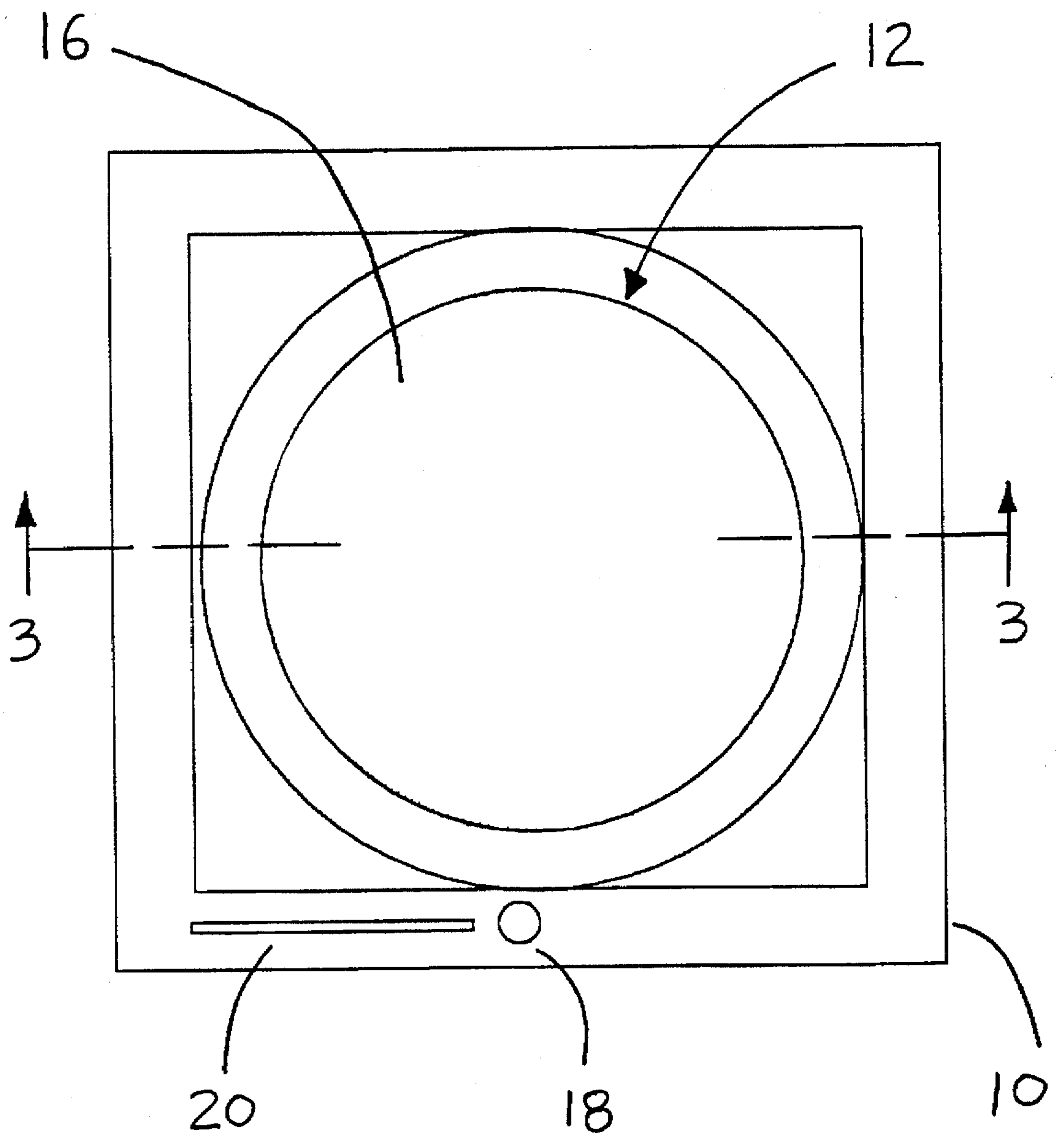
FIG. 2 TOP VIEW

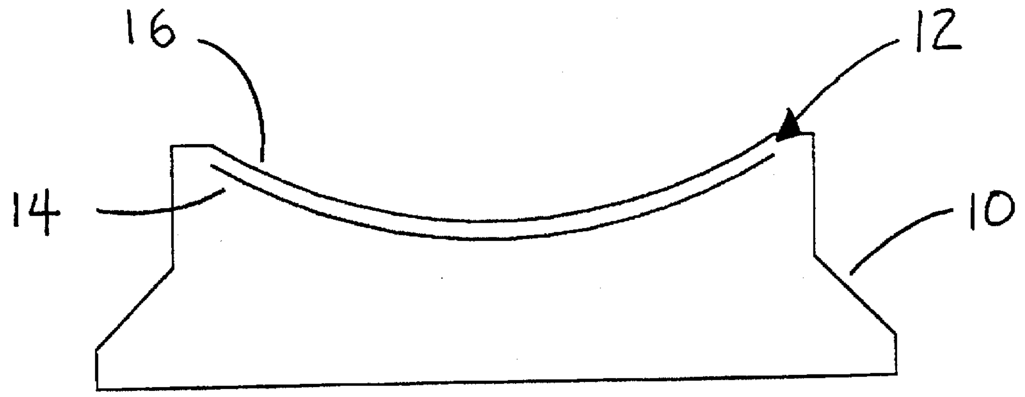
FIG. 3 SIDE VIEW-
CROSS SECTION
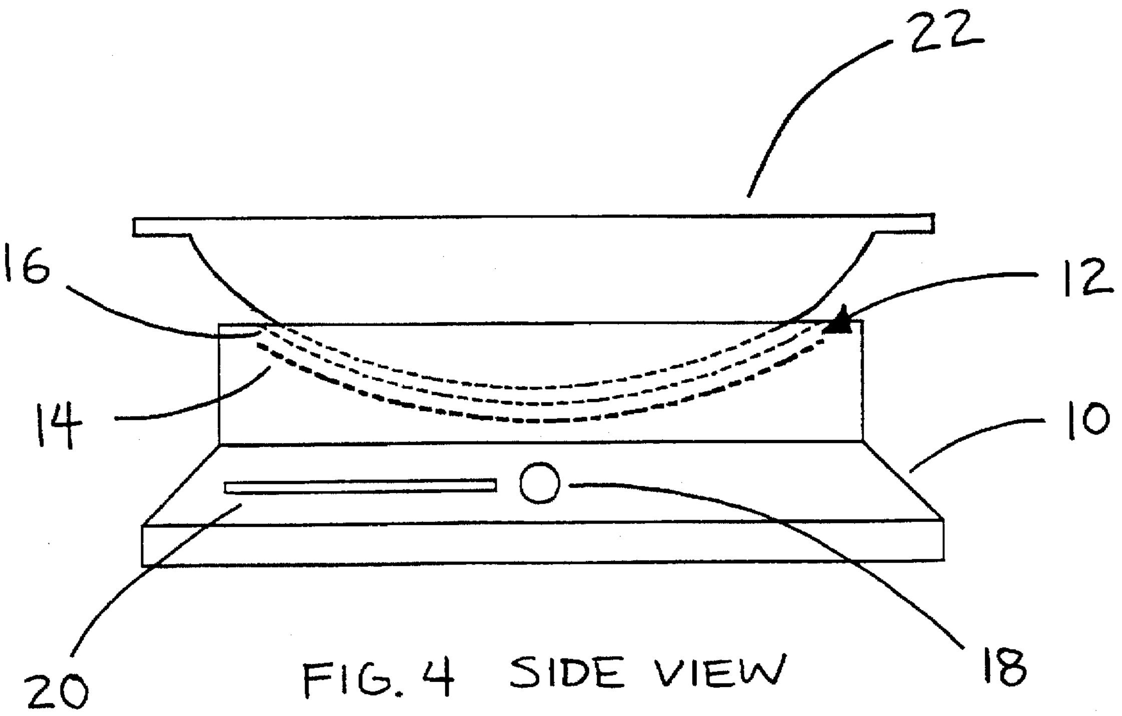
FIG. 4 SIDE VIEW

CONCAVE INDUCTION COOKING SURFACE FOR WOK COOKING

BACKGROUND

1. Field of Invention

This invention relates to induction cooking appliances, and more specifically to a concave induction cooking surface to be used for wok cooking.

BACKGROUND

2. Description of Prior Art

A wok is a round bottomed metallic pan that was first used for cooking in Asia and has now found widespread use throughout the world.

Woks are typically heated by gas flames or an electric heating element applied to the bottom of the wok. Gas is the preferred method of wok cooking since gas provides even heat to the bottom of the wok, and because gas is relatively responsive to changes in heat settings.

However, gas is frequently not available, and thus the use of electric heating elements for woks has increased in recent years. The wok cooking methods using electric heating elements have taken several forms. One widely used method of electric cooking is a cooktop which has coiled electric resistive elements. Another method of electric cooking involves a solid cast iron disk that is sealed to the cooktop surface and heated electrically. Still another method of electric cooking incorporates radiant (glass-ceramic) cooktops which consist of electric coils embedded in a glass-ceramic cooktop. Stand-alone electric woks that have their own self-contained heating elements are also popular.

However, these methods of electric cooking all suffer from a major disadvantage in that they are not as responsive as gas times to changes in heat settings. The electric heating elements used in the electric cooking methods above often require considerable time to heat up and considerable time to cool down in response to user settings. This often leads to the overcooking or undercooking of foods prepared by the above methods.

In light of the problem of responsiveness to heat settings, inventors have developed a method of electric cooking called induction cooking, which has also been used to heat woks. In induction cooking, the heating element consists of a high frequency induction coil under a glass cooking surface. Pans made of ferrous materials are used and heat is produced by electromagnetic induction between the coil and the pan. The induction method of cooking allows rapid changes in the heat induced in the pan, similar to the rapid heat response of gas cooking.

However, despite this responsiveness to heat settings, induction cooking has not been effectively utilized for wok cooking. This is because effective wok cooking requires a traditional round bottomed wok that allows for more even heating and efficient use of wok utensils. Unfortunately, all current induction cooking systems employ flat heating elements that in turn require a flat bottomed wok for optimum heat transfer. This is due to the fact that any separation of the high frequency induction coil from the ferrous metal of the wok by more than a few millimeters greatly reduces the amount of heating that can occur. As a result, traditional round bottomed woks perform poorly on flat induction heating cooktops and flat bottomed woks are used instead. Flat bottomed woks generally are not as well suited to stir fry cooking as true round bottomed woks because of a number of disadvantages including:

(a) the flat bottom of such woks becomes much hotter than the concave sides of the wok, leading to uneven heating of food; and (b) flat bottomed woks do not permit the sweeping, surface-scooping motion of the round-edged spatulas used in wok cooking; which rapid, fluid motions are essential for effective stir frying; and (c) at any given diameter, flat bottomed woks have less surface area in contact with a flat heating element when compared to a round bottomed wok in contact with a concave heating element, thereby decreasing the heating efficiency; and (d) flat bottomed woks do not permit the user to rock the wok smoothly over the heating surface in order to efficiently spread other ingredients to the food being cooked in the wok while keeping the wok in full contact with the heating surface.

OBJECTS AND ADVANTAGES

Accordingly, the several objects and advantages of my invention are:

(a) to provide a concave induction cooking surface for a wok that responds quickly to changes in heat settings; and (b) to provide a concave induction cooking surface for a wok that permits the use of round bottomed woks, which distribute heat more evenly than flat bottomed woks; and (c) to provide a concave induction cooking surface for a wok that permits the use of round bottomed woks and the associated sweeping, surface-scooping motion of round-edged spatulas used in wok cooking; which motions are essential for easy stir frying; and (d) to provide a concave induction cooking surface for a round bottomed wok that provides a greater contact area between the wok and the heating surface for any given wok diameter, when compared to a flat electric heating surface and a flat bottomed wok; and (e) to provide a concave induction cooking surface for a wok that allows the user to rock a round bottomed wok over such concave cooking surface in order to efficiently spread other ingredients to the food being cooked in the wok while keeping the wok in full contact with the concave cooking surface.

Further objects and advantages are to provide a wok cooking surface that is simple to use and easy to clean. Still further objects and advantages will become apparent from a consideration of the ensuing descriptions and drawings.

DRAWING FIGURES

FIG. 1 shows a perspective view of a cooking unit with a concave induction cooking surface.

FIG. 2 shows a top view of a cooking unit with a concave induction cooking surface.

FIG. 3 shows a side view-cross section of a cooking unit with a concave induction cooking surface.

FIG. 4 shows a side view of a cooking unit with a concave induction cooking surface.

REFERENCE NUMERALS IN DRAWINGS

10 main cooking unit

12 concave induction cooking surface

14 concave induction coil

16 concave glass surface
18 control knob
20 visual display
22 round bottomed wok Description—FIGS. 1–3

A typical embodiment of the present invention is illustrated in FIG. 1 (perspective view). A main cooking unit 10 contains a concave induction cooking surface 12, an attached control knob 18, and a visual display 20.

As shown in FIGS. 1 and 3, cooking unit 10 acts as a base for concave induction heating surface 12. Cooking unit 10 also has an external control knob 18 that controls the amount of electric current flowing to induction coil 14 from an electric current source (not shown). In the preferred embodiment, control knob 18 is a dial that can be turned, but other control mechanisms can also be used. Cooking unit 10 also has visual display 20 located on one side. Visual display 20 consists of a row of light emitting diodes (not shown) that light up to correspond to the amount of electric current supplied to induction coil 14. Other methods of visual display may be used to show the amount of electric current supplied to induction coil 14.

Turning now to FIG. 2 and FIG. 3, these drawings respectively show a top view and a side view-cross section of cooking unit 10. FIG. 3 shows that concave induction cooking surface 12 is composed of a concave induction coil 14 located underneath a concave glass surface 16. Induction coil 14 and glass surface 16 are both arranged in a concave shape similar to the shape of the bottom of a round bottomed wok. In the preferred embodiment, induction coil 14 and glass surface 16 form a concave bowl shape which can have a diameter of 22.86 cm and a depth of 2.54 cm when used with an average sized wok. However, the bowl shape created by induction coil 14 and glass surface 16 can be of other diameters and depths in order to accommodate woks of different sizes.

In the preferred embodiment, the construction of induction coil 14 and the materials employed in such construction are based on the technology used in induction heating coils manufactured by General Electric Corporation and Roper Corporation. More specifically, induction coil 14 in the preferred embodiment is based on the technology described in U.S. Pat. No. 4,092,511. However, induction heating coils based on other technologies may also be used.

Glass surface 16 used in the preferred embodiment is smooth, nonmetallic, heat-resistant glass. Other smooth, nonmetallic, heat-resistant materials may also be used. Glass surface 16 is bound to induction coil 14 by a high temperature resistant adhesive such as a silicone adhesive. However, other means may also be used to join glass surface 16 to induction coil 14.

From the description above, a number of advantages of my concave induction cooking surface become evident:

(a) the concave induction cooking surface reacts quickly to changes in heat settings.

(b) the concave induction cooking surface allows the use of round bottomed woks, which distribute heat more evenly than flat bottomed woks.

(c) the concave induction cooking surface allows the use of round bottomed woks, which in turn allows the use of round-edged spatulas capable of the sweeping and surface-scooping motions that are important for easy stir frying.

(d) the concave induction cooking surface provides a greater contact area between a round bottomed wok and the cooking surface for any given wok diameter, when compared to a flat electric heating surface and a flat bottomed wok.

(e) the concave induction cooking surface allows the user to rock a round bottomed wok over the concave induction cooking surface in order to efficiently spread other ingredients to the food being cooked in the wok while keeping the wok in full contact with the cooking surface.

Operation of Invention—FIG. 4

The manner of using cooking unit 10 is shown in FIG. 4. A round bottomed wok 22 made of ferrous material is placed on top of glass surface 16 of induction cooking surface 12. To begin cooking, one adjusts control knob 18 to regulate the amount of electric current supplied by an electric current source (not shown) to induction coil 14. As electric current is supplied to induction coil 14, heat is produced in wok 22 by electromagnetic coupling between induction coil 14 and wok 22.

Meanwhile, visual display 20 provides the user of cooking unit 10 with visual feedback as to the amount of electric current supplied to induction coil 14. Visual display 20 consists of a row of light emitting diodes (not shown) that light up one by one and remain lit as control knob 18 is adjusted to allow more electric current to flow to induction coil 14. As more electric current is supplied to induction coil 14, more heat is magnetically induced in wok 22. Conversely, the light emitting diodes of visual display 20 turn off one by one and remain turned off as control knob 18 is adjusted to decrease the amount of electric current flowing to induction coil 14. As less electric current is supplied to induction coil 14, less heat is magnetically induced in wok 22.

Summary, Ramifications and Scope

Accordingly, the reader will see that the concave shape of the concave induction cooking surface allows individuals to use round bottomed woks on a responsive heating source, thereby permitting individuals who use electric cooking apparatus to enjoy the benefits of efficient wok cooking. A concave induction cooking surface has the additional advantages in that:

it allows rapid changes in heat settings;

it permits the use of round bottomed woks, which distribute heat more evenly than flat bottomed woks;

it allows the use of round bottomed woks, which in turn allows the use of round-edged spatulas capable of the sweeping and surface-scooping motions that are important for easy stir frying;

it provides a greater contact area between a round bottomed wok and the cooking surface for any given wok diameter, when compared to a flat electric heating surface and a flat bottomed wok; and it allows the user to rock a round bottomed wok over the concave induction cooking surface in order to efficiently spread other ingredients to the food being cooked in the wok while keeping the wok in full contact with the cooking surface.

Although the description above contains many specificities, these should not be construed as limiting the scope of the invention but as merely providing illustrations of the presently preferred embodiment of this invention. For example, different dimensions of the cooking unit, cooking surface, glass surface or induction coil may be used to accommodate woks of different sizes. In addition, visual feedback may not be required, or may be incorporated in a different manner. Thus, the scope of the invention should be determined by the appended claims and their legal equivalents, rather than by the examples given.

I claim:

1. An induction heating device for bowl-shaped cooking pans, comprising: a bowl-shaped induction heating coil having a peripheral edge which defines a circle.

2. The induction heating device of claim 1, further including a bowl-shaped surface of non-metallic, heat-resistant material, having a peripheral edge which defines a circle, placed atop said induction heating coil.

3. The induction heating device of claim 1, further including a main unit supporting said surface and said induction heating coil, and with said main unit also containing a control device to control the supply of electric current to said induction heating coil.

4. The induction heating device of claim 1, further including a visual display showing the amount of electric current supplied to said induction heating coil.

* * * * *